Patented June 17, 1941

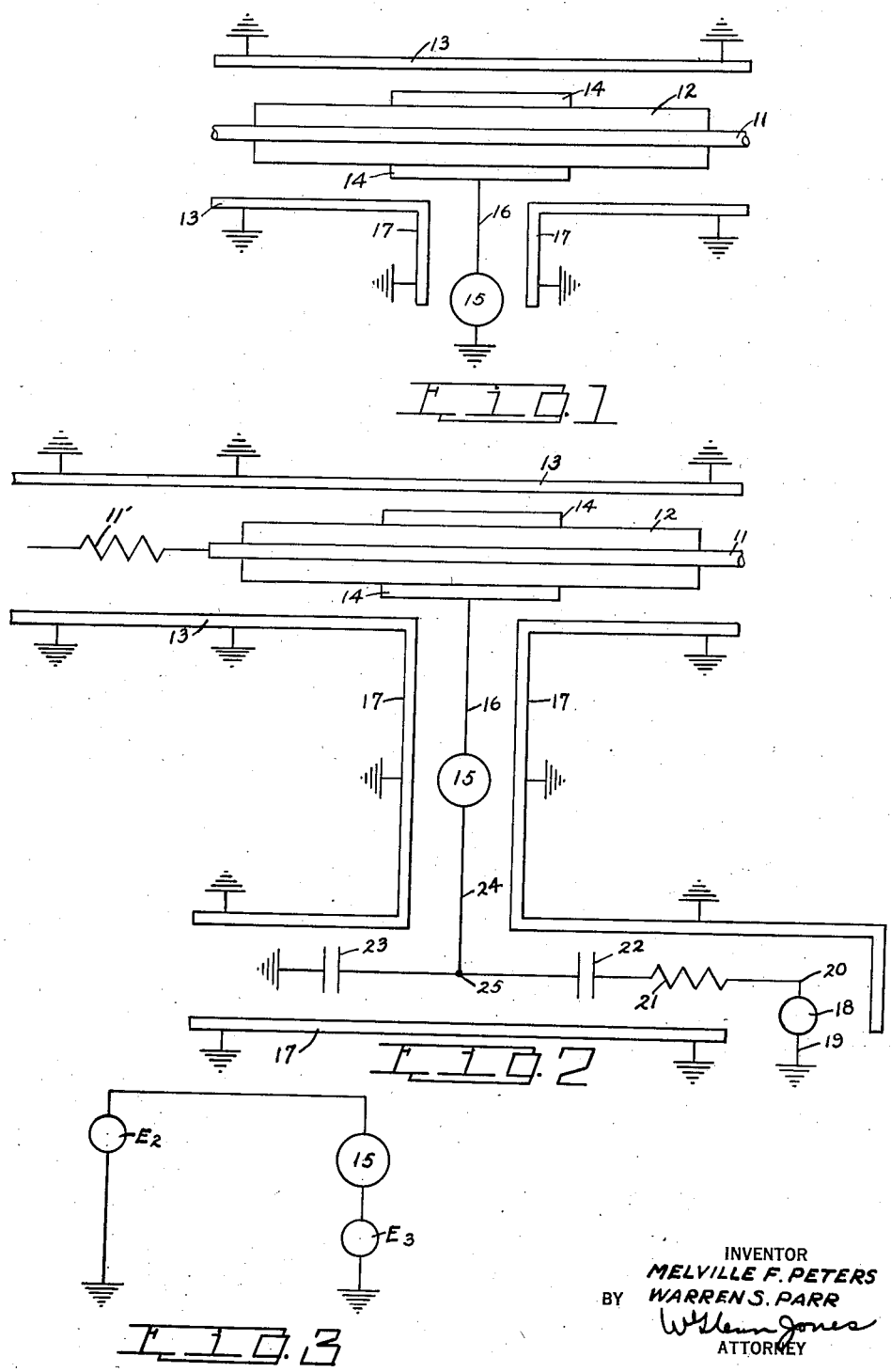

2,245,604

UNITED STATES PATENT OFFICE 2,245,604

IGNITION INDICATOR

Melville F. Peters, Beltsville, Md., and Warren S. Parr, United States Navy

Application April 27, 1940, Serial No. 332,063

29 Claims. (Cl. 175—183)

(Granted under the act of March 3, 1883, as amended April 30, 1928; 370 O. G. 757)

This invention relates generally to electrical ignition systems of internal combustion engines and particularly to devices for indicating the performance of such systems. More particularly, it relates to improvements in devices for indicating the performance of spark plugs of well-shielded aircraft engine ignition systems, such as that described in United States Patent No. 2,181,149.

An object of our invention is to provide an improved device for indicating the performance of ignition systems of internal combustion engines where such engines are located relatively remote from the indicating device.

Another object of our invention is to provide an improved device for indicating the performance of ignition systems of internal combustion engines which permits the use of longer leads connecting such engines to the indicating device.

A further object of our invention is to provide an improved device for indicating the performance of ignition systems of internal combustion engines where, due to structural or other difficulties, the pick-up voltage available at the indicating device is reduced.

An additional object of our invention is to provide an improved device for indicating the performance of ignition systems of internal combustion engines which prevents false indications of ignition and spark plug performance.

Our invention will be described in connection with the attached drawing, in which:

Fig. 1 shows the basic invention of United States Patent No. 2,181,149 and is practically identical with Fig. 1 of that patent;

Fig. 2 shows schematically our invention as applied to a well-shielded ignition conductor of an internal combustion engine; and Fig. 3 shows the simplified electrical circuit of the structure of Fig. 2.

Referring to Fig. 1, a conductor 11 connecting the distributor (not shown) of an aircraft internal combustion engine to a spark plug (not shown) thereof, is covered with suitable high voltage insulation 12 and is contained within grounded shield 13. A conductive sheath 14 surrounds a portion of conductor 11, is a tight fit around the insulation 12 thereof and is also contained within shield 13. Sheath 14 is connected to one terminal of a voltage indicating device 15 by conductor 16, the remaining terminal of voltage indicating device 15 being connected to ground. Conductor 16 is led through an opening in shield 13 and is surrounded by shield 17 which is effectively bonded to shield 13 and is also connected to ground.

A capacity relation exists between conductor 11 and sheath 14 and other capacity relations exist between sheath 14 and ground, and also between conductor 16 and ground.

It is disclosed in the aforementioned patent that when a high voltage is impressed between conductor 11 and ground, as occurs periodically when the spark plug to which conductor 11 is connected is energized in accordance with the timing of the engine, a voltage is impressed across voltage indicator 15, according to the following relation:

$$E_2 = \frac{C_1}{C_1 + C_2} E \qquad (I)$$

where $E$ = the voltage impressed between conductor 11 and ground, $E_2$ = the voltage impressed across the voltage indicating means 15, $C_1$ = the capacity between sheath 14 and conductor 11, $C_2$ = the combined capacity between sheath 14 and ground and also between conductor 16 and ground.

The above equation will hereinafter be denominated Equation I.

It is apparent from the above that, for a given value of $E$, $E_2$ can be varied to suit the requirements of the particular voltage indicating means in use by varying $C_1$ or $C_2$ or both. The value of $C_1$ can be varied by using insulation 12 of a different dielectric constant, by varying the separation between the sheath 14 and the conductor 11 and by varying the length of sheath 14. However, it has been found desirable to clamp sheath 14 tightly around insulation 12 and to use the usual commercially available high voltage insulation 12, so that, in practice, the value of $C_1$ is varied by changing the length of sheath 14. While a certain minimum value of $C_2$ is unavoidable in a shielded installation of this type, the value of $C_2$ in some installations is necessarily increased due to the length of conductor 16 and shield 17.

For example, in certain multi-engined aircraft installations it has been found necessary to make conductor 16 and shield 17 as long as 26 ft. in order to locate indicator 15 on the pilot's instrument panel, such causing a considerable increase in the value of $C_2$. While this increase in the value of $C_2$ might possibly be offset by greater separation between conductor 16 and shield 17, and also between sheath 14 and shield 13, there are practical limitations which prevent such. An inspection of Equation I shows that such increased value of $C_2$ causes a reduction in the voltage available across indicator 15, the value of $C_1$ remaining the same.

To overcome this reduction in available voltage across the indicator 15, the value of $C_1$ could be increased, but this, too, has practical limitations in various installations, one being the space available for the sheath 14.

One type of voltage indicating means readily adaptable for use in aircraft is the neon bulb, such being relatively rugged, inexpensive, small in space, light in weight and readily replaceable. With long conductors 16 and shields 17, and with ordinary lengths of sheath 14, it has been found that, due to the aforementioned increase in value of $C_2$, the voltage available is insufficient to cause certain neon bulbs, which it is desirable to use as indicating means 15, to glow brightly enough to be readily observable in daylight.

Since to lengthen sheath 14 or to shorten conductor 16 and its associated shield 17 may require undesirable structural alterations in the aircraft or its engines, a method has been evolved to provide adequate voltage for such neon bulbs without resorting to such alterations.

Furthermore, it has been found that in certain installations, a neon discharge bulb used as indicator 15 (Fig. 1) flashes at times when the spark plug to which conductor 11 is connected is fouled, either wholly or partially. These spurious indications are produced due to the fact that, even though the spark plug to which conductor 11 is connected is then at ground potential, conductor 11, in the vicinity of sheath 14, is above ground potential due to the voltage drop in conductor 11 between sheath 14 and the spark plug, and is sufficiently above ground potential that the capacitively coupled voltage across the neon bulb causes the bulb to flash. These false indications are most likely to occur when indicator 15 is unusually sensitive and when there is a considerable length of ignition conductor 11 between sheath 14 and the spark plug to which the cable is connected.

Referring to Fig. 2, which shows the preferred form of our invention, conductor 11, insulation 12, conductive sheath 14, conductor 16 and grounded shield 13 are the same as in Fig. 1. One terminal 19 of a source 18 of electromotive force, which may be an alternating current generator, is connected to ground, the other terminal 20 of source 18 being grounded through a circuit comprising resistance 21, capacitor 22 and capacitor 23 in series, conductor 25 providing the common connection between capacitors 22 and 23. Indicator 15 is not grounded directly as in Fig. 1, but is connected to conductor 25 by conductor 24. Capacitors 22 and 23, resistor 21, conductors 16, 24 and 25, as well as the conductors which form a part of the series circuit between terminal 20 and ground, are all enclosed in a well-grounded shield 17, which is preferably made up of a plurality of individual grounded shields, bonded together. Impedance 11', which may be either an inductance or a resistor, is inserted in series with conductor 11 between sheath 14 and the engine distributor. Impedance 11' is contained within grounded shield 13, as shown.

Impedance 11' is employed to eliminate the aforementioned false indications which occur in some installations when the spark plug to which conductor 11 is connected is fouled. The effect of this impedance is to greatly reduce the voltage drop in conductor 11 between sheath 14 and the spark plug to such a low value that the capacitively coupled voltage to indicator 15 is negligible, and insufficient to cause the bulb to flash. With impedance 11' in the circuit, practically all of the voltage drop occurring in the secondary circuit when the distributor gap breaks down can be made to take place in impedance 11', so that only a small voltage drop occurs in conductor 11 itself. Instead of inserting an impedance 11' in each ignition conductor 11 connected to a spark plug, a single impedance may be inserted in series with the conductor connecting the ungrounded high voltage terminal of the ignition coil secondary winding to the engine distributor, or impedance 11' may be made a part of the secondary winding of the coil, with like results.

In the case of air craft or vehicles not provided with radio receiving equipment, shields 13 and 17 may be omitted, as the primary purpose of such shields is to prevent ignition interference with radio reception. In the event the shields are omitted, capacity $C_2$ becomes negligible and the desirability of the employment of the auxiliary voltage supplied by source 18 is not as great. However, where a considerable voltage is required to give a desired indication on the particular voltage indicating device employed, and where it is not practicable to alter sheath 14 and/or insulation 12, the improvements described herein have application, even in unshielded installations.

Source 18 need not be a specially provided source of electromotive force, for we have found it entirely practicable to utilize, in the case of certain aircraft, the 800 cycle 110 volt alternating current radio motor generator already installed in such aircraft. Only a very small circuit drain from source 18 is required for our invention. Resistor 21 has been inserted in the circuit to act as a "suppressor" to prevent ignition interference with the use of radio in the aircraft. A value of 10,000 ohms has been found satisfactory for resistor 21. Capacitors 22 and 23 in series act as a voltage divider circuit. By varying the value of such capacitors, any desired voltage can be obtained between conductor 24 and ground up to substantially the maximum output voltage of source 18. While Fig. 2 shows the use of capacitors 22 and 23 in the voltage divider circuit, either resistances and/or inductances could satisfactorily be employed in such circuit. If a direct potential source be utilized as source 18, any satisfactory voltage divider circuit may be employed.

Denominating as $E_3$ the aforementioned voltage between conductor 24 and ground, such voltage obtainable from the voltage divider circuit alone, it is apparent that Fig. 3 represents the simplified electrical schematic of Fig. 2, with $E_2$ (Equation I) and $E_3$ effectively in series with the indicating device 15.

Our invention is adjusted as follows: With the engine in operation, and with the ignition circuit including conductor 11 and the spark plug to which it connects operating normally, vary the relative values of capacitors 22 and 23 until a visible indication of the desired value or intensity is produced at indicating device 15. In the case of a neon bulb used as the indicating device, the value of capacitors 22 and 23 should be adjusted until the bulb glows brightly enough to be easily observable in daylight. The voltage from the voltage divider circuit must, of course, be somewhat less than the break-down voltage of the bulb.

In operation, voltage $E_2$ is superimposed on voltage $E_3$ such that the combination is sufficient to cause a neon bulb, used as indicating device 15, to glow. Even where $E_3$ is an alternating voltage, this superimposition occurs sufficiently frequently at the proper points in the voltage wave, that a neon bulb employed as indicating device 15 appears to glow steadily, due to the persistence of vision, when the ignition circuit to which our invention is applied is operating properly.

Other modifications and changes in the proportions and arrangements of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

We claim:

1. In combination, an insulated high voltage conductor connected to a spark plug of an internal combustion engine, a conductive sheath surrounding a portion of said conductor and being capacitively coupled thereto, a voltage indicating means, a source of electromotive force, a voltage dividing means connected across said source, said voltage dividing means having one terminal thereof connected to ground, conductive means connecting said indicating means between said sheath and a point of said voltage dividing means above ground potential, and a grounded shielding means for the above.

2. In combination, an insulated high voltage conductor connected to a spark plug of an internal combustion engine, a conductive sheath surrounding a portion of said conductor and being capacitively coupled thereto, a voltage indicating means, a source of electromotive force, a voltage dividing means connected across said source, said voltage dividing means having one terminal thereof connected to ground, conductive means connecting said indicating means between said sheath and a point of said voltage dividing means above ground potential.

3. In combination, an insulated high voltage conductor connected to a spark plug of an internal combustion engine, a conductive sheath surrounding a portion of said conductor and being capacitively coupled thereto, a neon discharge bulb, a source of electromotive force, a voltage dividing means connected across said source, said voltage dividing means having one terminal thereof connected to ground, conductive means connecting said bulb between said sheath and a point of said voltage dividing means above ground potential, the potential between said point and ground being less than the break down voltage of said bulb, and a grounded shielding means for the above.

4. In combination, an insulated high voltage conductor connected to a spark plug of an internal combustion engine, a conductive sheath surrounding a portion of said conductor and being capacitively coupled thereto, a voltage indicating means, a source of electromotive force having one terminal thereof connected to ground, relatively long conductive means connecting said indicating means between said sheath and an ungrounded terminal of said source, and a grounded shielding means for the above.

5. In combination, an insulated high voltage conductor connected to a spark plug of an internal combustion engine, a conductive sheath surrounding a portion of said conductor and being capacitively coupled thereto, a voltage indicating means, a source of electromotive force having one terminal thereof connected to ground, conductive means connecting said indicating means between said sheath and an ungrounded terminal of said source.

6. In combination, a high voltage conducting means connected to a spark plug of an internal combustion engine, a separate source of electromotive force, a voltage indicating means, said voltage indicating means being capacitively coupled to said conducting means and being grounded through said source, and a grounded shielding means for the above.

7. In combination, a high voltage conducting means connected to a spark plug of an internal combustion engine, a separate source of electromotive force, a voltage indicating means, said voltage indicating means being capacitively coupled to said conducting means and being grounded through said source.

8. In combination, a high voltage conductor connected to a spark plug of an internal combustion engine, a separate source of electromotive force, a gas discharge bulb, said bulb being capacitively coupled to said conductor and being grounded through said source, the electromotive force of said source applied to said bulb being less than the break-down voltage therefor, and a grounded shielding means for the above.

9. In combination, a high voltage conductor connected to a spark plug of an internal combustion engine, a grounded voltage indicating means capacitively coupled to said conductor, means for applying an additional voltage to said indicating means less than the indicating voltage of said indicating means, and an external grounded shielding means for the above.

10. In combination, a high voltage conductor connected to a spark plug of an internal combustion engine, a grounded voltage indicating means capacitively coupled to said conductor, and means for applying an additional voltage to said indicating means less than the indicating voltage of said indicating means.

11. In combination, an insulated high voltage conductor connected to a spark plug of an internal combustion engine, an impedance means connecting said conductor to a distributor means of said engine, a conductive sheath surrounding a portion of said conductor and being capacitively coupled thereto, a voltage indicating means, a source of electromotive force, a voltage dividing means connected across said source, said voltage dividing means having one terminal thereof connected to ground, conductive means connecting said indicating means between said sheath and a point of said voltage dividing means above ground potential, and a grounded shielding means for the above.

12. In combination, an insulated high voltage conductor connected to a spark plug of an internal combustion engine, an impedance means connecting said conductor to a distributor means of said engine, a conductive sheath surrounding a portion of said conductor and being capacitively coupled thereto, a voltage indicating means, a source of electromotive force, a voltage dividing means connected across said source, said voltage dividing means having one terminal thereof connected to ground, conductive means connecting said indicating means between said sheath and a point of said voltage dividing means above ground potential.

13. In combination, an insulated high voltage conductor connected to a spark plug of an internal combustion engine, an impedance means connecting said conductor to a distributor means of said engine, a conductive sheath surrounding a portion of said conductor and being capacitively coupled thereto, a neon discharge bulb, a source of electromotive force, a voltage dividing means connected across said source, said voltage dividing means having one terminal thereof connected to ground, conductive means connecting said bulb between said sheath and a point of said voltage dividing means above ground potential, the potential between said point and ground being less than the break down voltage of said bulb, and a grounded shielding means for the above.

14. In combination, an insulated high voltage conductor connected to a spark plug of an internal combustion engine, an impedance means connecting said conductor to a distributor means of said engine, a conductive sheath surrounding a portion of said conductor and being capacitively coupled thereto, a voltage indicating means, a source of electromotive force having one terminal thereof connected to ground, conductive means connecting said indicating means between said sheath and an ungrounded terminal of said source, and a grounded shielding means for the above.

15. In combination, an insulated high voltage conductor connected to a spark plug of an internal combustion engine, an impedance means connecting said conductor to a distributor means of said engine, a conductive sheath surrounding a portion of said conductor and being capacitively coupled thereto, a voltage indicating means, a source of electromotive force having one terminal thereof connected to ground, conductive means connecting said indicating means between said sheath and an ungrounded terminal of said source.

16. In combination, a high voltage conducting means connected to a spark plug of an internal combustion engine, an impedance means connecting said conducting means to a source of high voltage, a separate source of electromotive force, a voltage indicating means, said voltage indicating means being capacitively coupled to said conducting means and being grounded through said separate source, and a grounded shielding means for the above.

17. In combination, a high voltage conducting means connected to a spark plug of an internal combustion engine, an impedance means connecting said conducting means to a source of high voltage, a separate source of electromotive force, a voltage indicating means, said voltage indicating means being capacitively coupled to said conducting means and being grounded through said separate source.

18. In combination, a high voltage conductor connected to a spark plug of an internal combustion engine, an impedance means connecting said conductor to a source of high voltage, a separate source of electromotive force, a gas discharge bulb, said bulb being capacitively coupled to said conductor and being grounded through said separate source, the electromotive force of said separate source being less than the breakdown voltage of said bulb, and a grounded shielding means for the above.

19. In combination, a high voltage conductor connected to a spark plug of an internal combustion engine, an impedance means connecting said conductor to a source of high voltage, a grounded voltage indicating means capacitively coupled to said conductor, means for applying an additional alternating voltage to said indicating means, and an external grounded shielding means for the above.

20. In combination, a high voltage conductor connected to a spark plug of an internal combustion engine, an impedance means connecting said conductor to a source of high voltage, a grounded voltage indicating means capacitively coupled to said conductor, means for applying an additional voltage to said indicating means.

21. In combination, a high voltage conducting means connected to a spark plug of an internal combustion engine, an impedance means connecting said conducting means to a source of high voltage, a grounded voltage indicating means capacitively coupled to said conducting means, and an external grounded shielding means for the above whereby a shunting capacitor to ground is formed across said voltage indicating means.

22. In combination, a high voltage conducting means connected to a spark plug of an internal combustion engine, an impedance means connecting said conducting means to a distributor means of said engine, a grounded voltage indicating means capacitively coupled to said conducting means, and an external grounded shielding means for the above whereby a shunting capacitor to ground is formed across said voltage indicating means.

23. In combination, a high voltage conducting means connected to a spark plug of an internal combustion engine, an impedance means connecting said conducting means to a source of high voltage, a grounded voltage indicating means capacitively coupled to said conducting means, and an external grounded shielding means for the above.

24. In combination, a high voltage conducting means connected to a spark plug of an internal combustion engine, an impedance means connecting said conducting means to a source of high voltage, and a grounded voltage indicating means capacitively coupled to said conducting means.

25. In combination, a high voltage ignition conductor connected to a spark plug of an internal combustion engine, an impedance means connecting said conductor to a source of high voltage, a conductive sheath surrounding a portion of said conductor and being capacitively coupled thereto, a voltage indicating means, a grounding means for said voltage indicating means, a conducting means connecting said sheath to said voltage indicating means, and a grounded shielding means for said conductor, said sheath and said conducting means.

26. In combination, a high voltage ignition conductor connected to a spark plug of an internal combustion engine, an impedance means connecting said conductor to a distributor means of said engine, a conductive sheath surrounding a portion of said conductor and being capacitively coupled thereto, a voltage indicating means, a grounding means for said voltage indicating means, a conducting means connecting said sheath to said voltage indicating means, and a grounded shielding means for said conductor, said sheath and said conducting means.

27. In combination, a high voltage ignition conductor connected to a spark plug of an internal combustion engine, an impedance means connecting said conductor to a source of high voltage, a conductive sheath surrounding a portion of said conductor and being capacitively coupled thereto, a voltage indicating means, a grounding means for said voltage indicating means, and a conducting means connecting said sheath to said voltage indicating means.

28. In combination, a high voltage ignition conductor connected to a spark plug of an internal combustion engine, an impedance means connecting said conductor to a source of high voltage, a conductive sheath surrounding a portion of said conductor and being capacitively coupled thereto, a voltage indicating means, a grounding means for said voltage indicating means, a conducting means connecting said sheath to said voltage indicating means, and a grounded shielding means for said conductor, said sheath and said conducting means whereby said sheath and said conducting means are capacitively coupled to said shielding means.

29. In combination, a high voltage ignition conductor connected to a spark plug of an internal combustion engine, an impedance means connecting said conductor to a distributor means of said engine, a conductive sheath surrounding a portion of said conductor and being capacitively coupled thereto, a voltage indicating means, a grounding means for said voltage indicating means, a conducting means connecting said sheath to said voltage indicating means, and a grounded shielding means for said conductor, said sheath and said conducting means whereby said sheath and said conducting means are capacitively coupled to said shielding means.

MELVILLE F. PETERS.
WARREN S. PARR.